Jan. 14, 1969 W. K. T. GLEIM 3,421,831
METHOD OF DYEING SYNTHETIC POLYMERIC MATERIALS
Filed Jan. 25, 1965
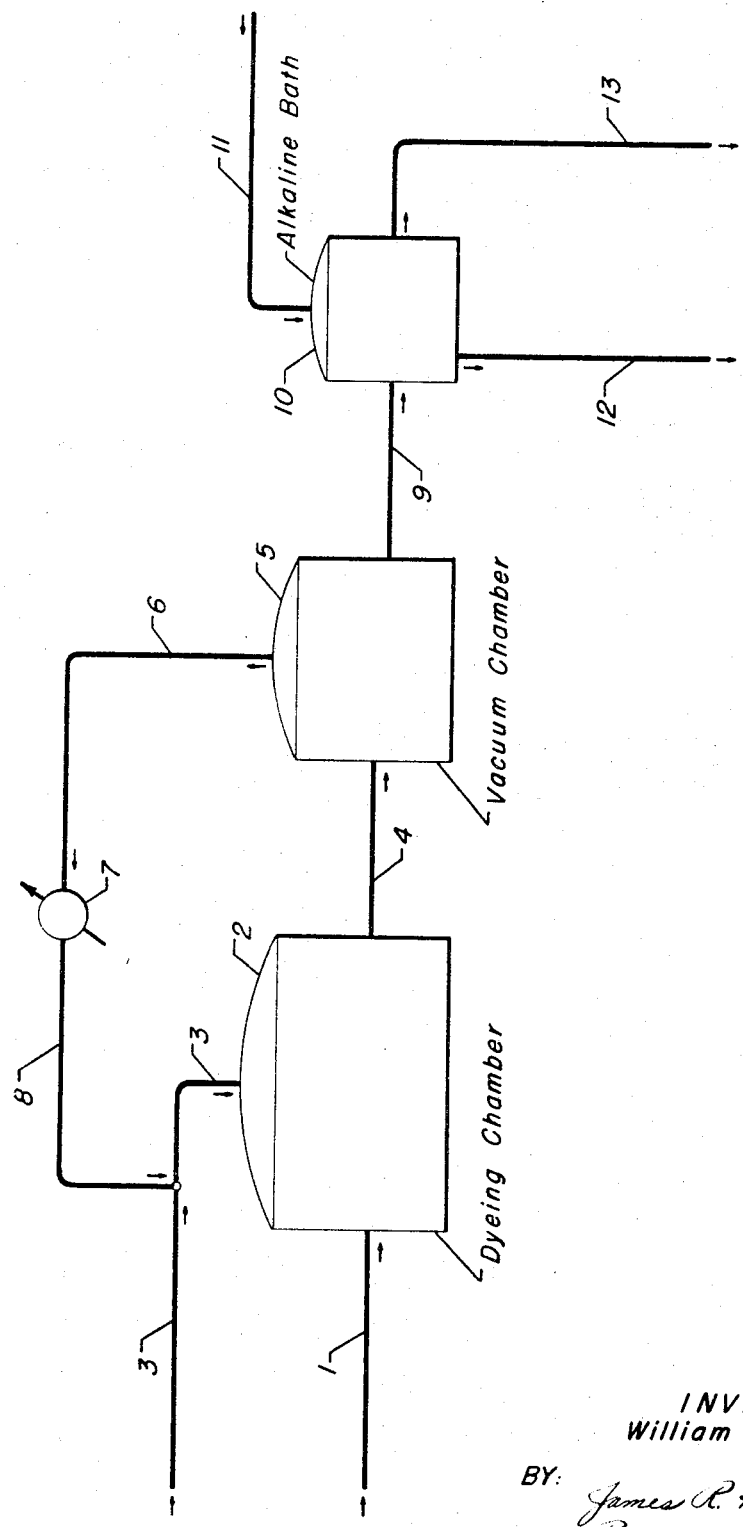
INVENTOR:
William K.T. Gleim
BY: James R. Hoatson Jr.
Raymond H. Nelson
ATTORNEYS

United States Patent Office 3,421,831
Patented Jan. 14, 1969

3,421,831
METHOD OF DYEING SYNTHETIC POLYMERIC MATERIALS
William K. T. Gleim, Island Lake, Ill., assignor to Universal Oil Products Company, Des Plaines, Ill., a corporation of Delaware
No Drawing. Filed Jan. 25, 1965, Ser. No. 427,571
U.S. Cl. 8—55     15 Claims
Int. Cl. D06p 1/16; C09b 67/00; D06p 3/00

ABSTRACT OF THE DISCLOSURE

Relatively insoluble dyes are applied to synthetic polymeric textile materials by contacting said materials with a solution of the dye dissolved in anhydrous hydrogen fluoride at sub-ambient temperatures.

---

This invention relates to a method of applying a dye to synthetic materials and more particularly to a method for applying certain relatively insoluble dyes to synthetic polymeric materials.

Heretofore, a problem has existed in the dyeing industry inasmuch as certain useful dyes of a type hereinafter set forth in greater detail are relatively insoluble in most solvents. Generically speaking, dyes such as indanthrenes, phthalocyanines, polyaromatic quinones, and to an even greater extent, their halogenated derivatives, comprise some of the most useful dyes due to the physical characteristics thereof such as color fastness, light stability, etc. However, one compound which will act as a solvent for these dyes comprises hydrogen fluoride, the aforementioned dyes being readily soluble in said compound.

It is therefore an object of this invention to provide a method for applying certain dyes to either naturally occurring or synthetic textiles and materials.

A further object of this invention is to provide an improved process for applying a dye to certain synthetic polymeric textiles.

One embodiment of this invention resides in a method of applying a dye to a synthetic polymeric material which comprises contacting said material with a solution of said dye dissolved in anhydrous hydrogen fluoride at a subambient temperature, and recovering the dyed material.

Another embodiment of this invention is found in a method of applying a substantially insoluble dye to a synthetic polymeric material which comprises contacting said material with a solution of said dye dissolved in anhydrous hydrogen fluoride at a temperature in the range of from about −10° to about 15° C. passing the resultant dyed material to a vacuum to remove any adhering hydrogen fluoride, and recovering the dyed material.

A further embodiment of this invention is found in a method of applying a dye comprising a halogenated phthalocyanine to a synthetic polymeric material which comprises contacting said material with a solution of said dye dissolved in anhydrous hydrogen fluoride at a temperature in the range of from about −10° to about 15° C. passing the resultant dyed material to a vacuum to remove any adhering hydrogen fluoride, and recovering the dyed material.

A specific embodiment of this invention is found in a method of applying a dye comprising copper pentadecachlorophthalocyanine to a polyester material which comprises contacting said polyester material with a solution of said dye dissolved in anhydrous hydrogen fluoride at a temperature in the range of about −10° to about 15° C. passing the resultant dyed material to a vacuum to remove any adhering hydrogen fluoride, and recovering the dyed material.

Other objects and embodiments will be found in the following further detailed description of this invention.

As hereinbefore set forth, the present invention is concerned with a method for applying certain dyes to textile materials and particularly to synthetic polymeric textiles. It is contemplated that the method of dyeing, as set forth in the present specification, should be especially useful for synthetic polymeric textiles which contain a minimum number of polar groups. Examples of these polymeric textiles are generally referred to as polyesters, polyamides, polyethylenes, polypropylenes, etc., the synthetic textiles being well-known in the art under particular trade names. These textiles are used for articles of clothing such as dresses, suits, coats, as seat covers for chairs, automobile seats, for stockings, etc.

The dyes which are used to impart a desired and specific color to these synthetic polymeric textiles comprise those dyes which are substantially insoluble or entirely insoluble in most solvents. Examples of these dyes include the indanthrenes, phthalocyanines, and polyaromatic quinones, and halogenated derivatives thereof. Specific examples of these dyes include anthraquinone condensation products of the indanthrene type known in the trade as C. I. Vat Green 8 (olive) having a Color Index No. 71050 or Indanthrene Khaki GG, C. I. Vat Brown 44 (reddish brown) having a Color Index No. 70802 or Indanthrene Brown GR, C. I. Vat Red 10 (bluish red) having a Color Index No. 67000 or Indanthrene Red FBB, C. I. Vat Blue 30 (blue) having a Color Index No. 67110 or Indanthrene Blue CLB C.I. Vat Green 12 (yellowish green) having a Color Index No. 70700 or Indanthrene Green 4G, etc.; indanthrones such as C. I. Vat Blue 4 (bright reddish blue) having a Color Index No. 69800 or indanthrene, C. I. Vat Green 6 (dull green) having a Color Index No. 69855 or Caledon Green RC, etc.; pyranthrones such as C. I. Vat Orange 9 (yellowish orange) having a Color Index No. 59700 or Indanthrene Golden Orange G, etc.; dibenzanthrones such as C. I. Vat Blue 20 (dull bluish violet to reddish navy) having a Color Index No. 59800 or the violanthrones. The Color Index Numbers for the above identified dyes are found in The Chemistry of Synthetic Dyes by K. Venkataraman, published by the Academic Press in 1952. In addition, another anthraquinone dye which is especially useful includes 1,4-bis-β-hydroxyethylamino-5,8-dihydroxyanthraquinone. Examples of phthalocyanine dyes include halogenated phthalocyanines such as pentadecachlorophthalocyanine; metal phthalocyanines such as copper phthalocyanine, cobalt, tetraphenylphthalocyanine, nickel phthalocyanine, iron phthalocyanine, etc., metal halogenated phthalocyanines such as copper pentadecachlorophthalocyanine, cobalt hexadecachlorophthalocyanine, etc., the desired color of the phthalocyanine being determined by the particular metal which is used. Still another type of useful dye which may be used comprises isoviolanthrone. It is to be understood that the aforementioned dyes are only representative of the class of dyes which may be used in the process of the present invention and that any dye which is insoluble in most solvents may be utilized in the process of this invention.

As hereinbefore set forth, the present invention is concerned with a method of applying dyes to synthetic polymeric materials. As was previously mentioned, one of the problems attendant to applying certain dyes to these synthetic polymeric materials which contain few or no polar groups is that certain of the dyes which may be utilized are insoluble in most solvents, both inorganic and organic in nature. This problem of non-solubility has been overcome by dissolving said dyes in liquid hydrogen fluoride and particularly anhydrous hydrogen fluoride. In addition, it is also contemplated that the textiles or yarns which are to undergo the dyeing process should also be dried to the extent that they contain only a very low water content. The necessity for using anhydrous hydrogen fluoride as a solvent for the aforementioned dyes and the necessity for drying the textiles or fibers to be dyed so that said materials contain no water or only a very low water content is occasioned by the fact that hydrofluoric acid is extremely corrosive in nature and therefore care must be taken to avoid the formation of hydrofluoric acid. This corrosive nature of the acid is well-known in the art. The acid will attack many materials and may be retained on the textiles, fibers or yarn which are dyed, thus rendering said materials incapable for use as clothing or as other articles of commerce which will come in contact with the person utilizing the same.

In a preferred embodiment of the invention, the dyeing process is effected in a continuous manner at subambient temperatures, said process temperature being in the range of from about $-10°$ to about $15°$ C. The application of the dye to the textile is effected by passing the yarn or textile to be dyed through a bah which comprises a dye of the type hereinbefore set forth in greater detail dissolved in liquid anhydrous hydrogen fluoride. The yarn or textile is contacted with the dye by passage through a bath of the solution or a spray, the different methods of application being dependent upon the particular textile or yarn and the particular dye to be applied. After contact by the dye with the textile or the yarn, the dyed material is then passed to a vacuum chamber whereby any hydrogen fluoride which has adhered to the textile or the yarn is removed. To further insure the removal of the last traces of any hydrogen fluoride which may still be present on the textile, it is contemplated that the material is then passed to a liquid bath comprising an alkaline solution, said solution comprising such alkaline materials as sodium carbonate, potassium carbonate, ammonium carbonate, etc. The hydrogen fluoride which is recovered from the vacuum chamber is passed to a condenser wherein it is condensed to liquid form and returned for use in the bath section of the apparatus.

Due to the aforementioned inherent corrosive nature of hydrofluoric acid, the dyeing apparatus, the vacuum chamber and the alkaline bath must consist of material which is relatively inert of the action of said fluoride. Therefore, the apparatus should consist of stainless steel tanks, pipes, valves, condensers, etc., or be lined with a plastic material such as poly tetrafluoroethylene which, in itself, is inert to the action of hydrogen fluoride.

The process of the present invention will be further illustrated with reference to the accompanying drawing which illustrates a simple schematic flow-sheet which may be utilized to dye certain synthetic polymeric materials. Various valves, condensers, pumps, controllers, etc., have been eliminated as not being essential to the complete understanding of the present invention. The utilization of these as well as other similar appurtenances will become obvious as the drawing is described.

Referring now to the drawing, a textile or yarn which is to be dyed is passed by appropriate means along line 1 to a dyeing chmaber 2 which is maintained at a subambient temperature by external cooling means not shown in the drawing. In this chamber, the textile or yarn is contacted with a dye of the type hereinbefore set forth which has been dissolved in anhydrous hydrogen fluoride, said solution being charged to dye chamber 2 through line 3 at a temperature below the boiling point of hydrogen fluoride, that is, below aobut $19°$ C., and preferably in a range of from about $-10°$ to about $15°$ C. In dyeing chamber 2, the textile or yarn which has previously been subjected to a dehydration treatment to remove all or substantially all of the water content is contacted by the dissolved dye, said contact being accomplished by standard means such as immersion of the textile or yarn in a bath of the dye solution, by spraying the dye solution, etc., as the textile passes through the dyeing chamber, or by any other means well-known in the art. The dyed material then passes along line 4 to a vacuum chamber 5 wherein any hydrogen fluoride which may still be present on the textile or yarn is removed. The hydrogen fluoride gas is withdrawn from vacuum chamber 5 though line 6 wherein it is condensed in condenser 7. The liquid hydrogen fluoride from condenser 7 is passed through line 8 and admixed with fresh hydrogen fluoride feed and thereafter passed to dyeing chamber 2 through line 3. The dyed textile or yarn then passes from vacuum chamber 5 along line 9 to another chamber 10 wherein the material is washed with an alkaline material such as sodium carbonate, potassium carbonate, etc., the alkaline material being charged to the bath through line 11. Any traces of hydrogen fluoride which still remain on the material are washed off by this bath, the used alkali solution being withdrawn through line 12. The synthetic textile or yarn which has been dyed is then removed from the bath 10 along line 13.

As hereinbefore set forth, the particular dyes which are utilized in the process of this invention comprise those dyes which are insoluble in most solvents. These dyes are especially useful inasmuch as they comprise mostly colors having a darker shade such as the blues, greens, violets, reds, purples, etc.; said dyes possessing the desirable physical characteristics of light fastness and color stability, when expoed to the presence of sunlight and air.

The following examples are given to illustrate the process of the present invention which, however, are not intended to limit the generally broad scope of the present invention in strict accordance therewith.

Example I

In this example, a textile which is formed of a polyester material woven into a textile is cut into 4" squares. A dye comprising copper pentadecachlorophthalocyanine is dissolved in liquid anhydrous hydrogen fluoride which is maintained at a temperature of about $10°$ C. The synthetic textile is placed in an apparatus which is cooled by external cooling means, said cooling means comprising a Dry Ice bath, whereby the temperature of the apparatus is maintained at about $3°$ C. The anhydrous hydrogen fluoride solution containing the dissolved copper pentadecachlorophthalocyanines, is added to the dyeing apparatus in such a manner that the textile is completely immersed therein. After a contact time of about one minute, the dyed material is removed from the apparatus and placed in a vacuum chamber, after which the air is evacuated down to a pressure of about 10 mm. of mercury. The excess hydrogen fluoride is removed thereby and is passed to a condenser wherein said hydrogen fluoride is liquified. Following this, the vacuum is broken and the dyed textile removed. The textile is then immersed in an alkaline bath which comprises a weak solution of sodium carbonate whereby any remaining hydrogen fluoride is removed; the textile is then washed, dried and recovered.

Example II

In this example, a synthetic material comprising a polyester textile is cut into 4" square swatches. The swatches are then placed in a dyeing apparatus which is cooled to a temperature of about $3°$ C. by means of external cooling means similar to that set forth in Example I above. An anhydrous hydrogen fluoride solution containing dissolved copper phthalocyanine is charged to the apparatus in such an amount so that the swatches are completely immersed therein. After a contact time of about 1 minute has elapsed, the swatches are removed and placed in a vacuum chamber wherein a pressure of about 10 mm. of mercury is attained. Substantially all of the excess hydrogen fluoride is removed by means of this vacuum and passed to a condenser wherein the hydrogen fluoride is liquified and reused as a solvent for the copper phthalocyanine. Upon removal of the majority of the excess hydrogen fluoride the vacuum is broken and the swatches removed from the apparatus. These swatches are then placed in an alkaline bath to remove the traces of the hydrogen fluoride. Following this, the swatches are washed and dried.

Example III

A polyethylene textile is treated in a manner similar to those textiles hereinbefore set forth in Examples I and II above, that is, by cutting 4″ square swatches of material. The material is then placed in a dyeing apparatus which is cooled to a temperature of about 3° C. by means of an icebath. A dye solution comprising copper pentadecachlorophthalocyanine which has been cooled to a temperature of about 10° C. is sprayed into the dyeing apparatus at such a rate so that the textile is contacted by the spray for a period of about two minutes. At the end of this time, the spray is discontinued and the material transferred to a vacuum chamber. The air is evacuated to a pressure of 10 mm. of mercury during which the excess hydrogen fluoride is passed off and collected in a condenser. The condensed hydrogen fluoride is recycled for use as a solvent for additional copper pentadecachlorophthalocyanine. The dyed material is removed from the vacuum after the pressure has been returned to atmospheric and is thereafter placed in a dilute potassium carbonate bath where any trace of hydrogen fluoride which still remains on the textile is removed. The fabric is then washed and dried.

Example IV

In this example, a polyamide material is subjected to the action of a dye solution comprising isoviolanthrone dissolved in liquid hydrogen fluoride, the dyeing solution and the dyeing apparatus being maintained at a temperature of about 10° C. Upon completion of the contact time of the textile by the dye which is approximately one minute in duration, the dyed textile is removed to a vacuum chamber. In this chamber air is evacuated until a pressure of approximately 10 mm. of mercury is reached. Excess hydrogen fluoride is removed by the vacuum and in gaseous form is passed to a condenser wherein it is condensed back into liquid form, and recycled for further use as a solvent. The pressure of the vacuum chamber is allowed to return to atmospheric and the dyed material is then placed in a dilute potassium carbonate bath. Following this, the material is washed and dried.

Example V

A polyamide material is cut into 4″ square swatches and placed in a dyeing apparatus which is maintained at a temperature of about 3° C. A dye solution comprising cobalt tetraphenylphthalocyanine dissolved in anhydrous hydrogen fluoride which is maintained at a temperature of about 10° C. is sprayed into the dyeing apparatus for a period of about 30 seconds in such a manner that the material contained therein is thoroughly contacted with the spray. Upon completion of the residence time, the dyed material is removed to a vacuum chamber where it is treated in a manner similar to that set forth in the above examples. Following this vacuum treatment, the material is recovered after pressure is returned to normal and placed in a dilute potassium carbonate bath to remove any traces of hydrogen fluoride which may be present on the textile. The textile is then removed from the bath, washed with water and dried.

I claim as my invention:

1. A method of applying a substantially insoluble dye to a textile material selected from the group consisting of polyesters, polyamides, polyethylenes, and polypropylenes which comprises contacting said material with a solution of said dye dissolved in anhydrous hydrogen fluoride at sub-ambient temperatures, passing the resultant dyed material to a vacuum to remove any adhering hydrogen fluoride, and recovering the dyed material.

2. A method for applying a substantially insoluble dye to a textile material selected from the group consisting of polyesters, polyamides, polyethylenes, and polypropylenes which comprises contacting said material with a solution of said dye dissolved in anhydrous hydrogen fluoride at a temperature in the range of from about −10° to about 15° C., passing the resultant dyed material to a vacuum to remove any adhering hydrogen fluoride, and recovering the dyed material.

3. A method of applying a dye to a polyester textile material which comprises contacting said material with a solution of said dye dissolved in anhydrous hydrogen fluoride at a temperature in the range of from about −10° to about 15° C., passing the resultant dyed material to a vacuum to remove any adhering hydrogen fluoride, and recovering the dyed material.

4. A method of applying a dye to a polyamide textile material which comprises contacting said material with a solution of said dye dissolved in anhydrous hydrogen fluoride at a temperature in the range of from about −10° to about 15° C., passing the resultant dyed material to a vacuum to remove any adhering hydrogen fluoride, and recovering the dyed material.

5. A method of applying a dye to a polyethylene textile material which comprises contacting said material with a solution of said dye dissolved in anhydrous hydrogen fluoride at a temperature in the range of from about −10° to about 15° C., passing the resultant dyed material to a vacuum to remove any adhering hydrogen fluoride, and recovering the dyed material.

6. A method of applying a dye comprising an indanthrene to a textile material selected from the group consisting of polyesters, polyamides, polyethylenes and polypropylenes which comprises contacting said material with a solution of said dye dissolved in anhydrous hydrogen fluoride at a temperature in the range of from about −10° to about 15° C., passing the resultant dyed material to a vacuum to remove any adhering hydrogen fluoride, and recovering the dyed material.

7. A method of applying a dye comprising a phthalocyanine to a textile material selected from the group consisting of polyesters, polyamides, polyethylenes and polypropylenes which comprises contacting said material with a solution of said dye dissolved in anhydrous hydrogen fluoride at a temperature in the range of from about −10° to about 15° C., passing the resultant dyed material to a vacuum to remove any adhering hydrogen fluoride, and recovering the dyed material.

8. A method of applying a dye comprising a metal phthalocyanine to a textile material selected from the group consisting of polyesters, polyamides, polyethylenes and polypropylenes which comprises contacting said material with a solution of said dye dissolved in anhydrous hydrogen fluoride at a temperature in the range of from about −10° to about 15° C., passing the resultant dyed material to a vacuum to remove any adhering hydrogen fluoride, and recovering the dyed material.

9. A method of applying a dye comprising a halogenated phthalocyanine to a textile material selected from the group consisting of polyesters, polyamides, polyethylenes and polypropylenes which comprises contacting said material with a solution of said dye dissolved in anhydrous hydrogen fluoride at a temperature in the range of from about −10° to about 15° C., passing the resultant dyed material to a vacuum to remove any adhering hydrogen fluoride, and recovering the dyed material.

10. A method of applying a dye comprising a metal halogenated phthalocyanine to a textile material selected from the group consisting of polyesters, polyamides, polyethylenes and polypropylenes which comprises contacting said material with a solution of said dye dissolved in anhydrous hydrogen fluoride at a temperature in the range of from about −10° to about 15° C., passing the resultant dyed material to a vacuum to remove any adhering hydrogen fluoride, and recovering the dyed material.

11. A method of applying a dye comprising copper pentadecachlorophthalocyanine to a polyester textile material which comprises contacting said polyester material with a solution of said dye dissolved in anhydrous hydrogen fluoride at a temperature in the range of about −10° to about 15° C., passing the resultant dyed material to a vacuum to remove any adhering hydrogen fluoride, and recovering the dyed material.

12. A method of applying a dye comprising copper phthalocyanine to a polyester textile material which comprises contacting said polyester material with a solution of said dye dissolved in anhydrous hydrogen fluoride at a temperature in the range of about −10° to about 15° C., passing the resultant dyed material to a vacuum to remove any adhering hydrogen fluoride, and recovering the dyed material.

13. A method of applying a dye comprising copper pentadecachlorophthalocyanine to a polyethylene textile material which comprises contacting said polyethylene material with a solution of said dye dissolved in anhydrous hydrogen fluoride at a temperature in the range of about −10° to about 15° C., passing the resultant dyed material to a vacuum to remove any adhering hydrogen fluoride, and recovering the dyed material.

14. A method of applying a dye comprising isoviolanthrone to a polyamide textile material which comprises contacting said polyamide material with a solution of said dye dissolved in anhydrous hydrogen fluoride at a temperature in the range of about −10° to about 15° C., passing the resultant dyed material to a vacuum to remove any adhering hydrogen fluoride, and recovering the dyed material.

15. A method of applying a dye comprising cobalt tetraphenylphthalocyanine to a polyamide textile material which comprises contacting said polyamide material with a solution of said dye dissolved in anhydrous hydrogen fluoride at a temperature in the range of about −10° to about 15° C., passing the resultant dyed material to a vacuum to remove any adhering hydrogen fluoride, and recovering the dyed material.

References Cited

UNITED STATES PATENTS 3,129,053    4/1964    Castle _____ 8—93

FOREIGN PATENTS 639,885    7/1950    Great Britain.

NORMAN G. TORCHIN, *Primary Examiner.*

T. J. HERBERT, Jr., *Assistant Examiner.*

U.S. Cl. X.R.

8—82